United States Patent

[11] 3,590,846

| [72] | Inventors | Eugen Eisele;<br>Hermann Steil, both of Heilbronn,<br>Germany |
|---|---|---|
| [21] | Appl. No. | 823,340 |
| [22] | Filed | May 9, 1969 |
| [45] | Patented | July 6, 1971 |
| [73] | Assignee | Cillichemie Ernst Vogelmann<br>Heilbronn, Germany |
| [32] | Priority | May 17, 1968 |
| [33] | | Germany |
| [31] | | P 17 73 459.7 |

[54] FLUID-PROPORTIONING DEVICE FOR ADDING A PREDETERMINED PROPORTION OF A SOLUBLE SUBSTANCE TO A FLUID IN A CONDUIT
7 Claims, 4 Drawing Figs.

[52] U.S. Cl. .................................. 137/101.11,
137/205.5, 137/268, 137/564.5
[51] Int. Cl. ........................................ B01d 11/02
[50] Field of Search........................... 137/101.11,
268, 205.5, 564.5; 239/310, 340, 364, 365

[56] References Cited
UNITED STATES PATENTS

| 2,166,370 | 7/1939 | Putnam | 137/101.11 |
| 2,579,334 | 12/1951 | Plank | 137/501 X |
| 2,594,519 | 4/1952 | Thurber | 137/101.11 |
| 3,172,423 | 3/1965 | Steinman | 137/510 X |
| 3,202,164 | 8/1965 | Thompson | 137/101.11 |

FOREIGN PATENTS

| 215,915 | 11/1960 | Austria | 137/268 |

Primary Examiner—Alan Cohan
Attorney—Nolte & Nolte

ABSTRACT: A flow-restricting passageway in the conduit diverts fluid into a bypass which leads through a tank where the additive is stored. Excess pressure in the bypass line leading from the conduit into the tank, relative to the pressure in the bypass return line leading from the tank into the conduit downstream of the flow-restricting passageway, is transmitted to a diaphragm interposed in the system. The diaphragm which is operatively connected with a flow-respondent check valve causes the latter to open, permitting fluid flow through the return path until pressure equalization in the bypass is restored. The device provides in this way for uniform concentration of the additive in the fluid returning into the conduit, regardless of fluid oscillations in the bypass caused by pressure fluctuations in the conduit.

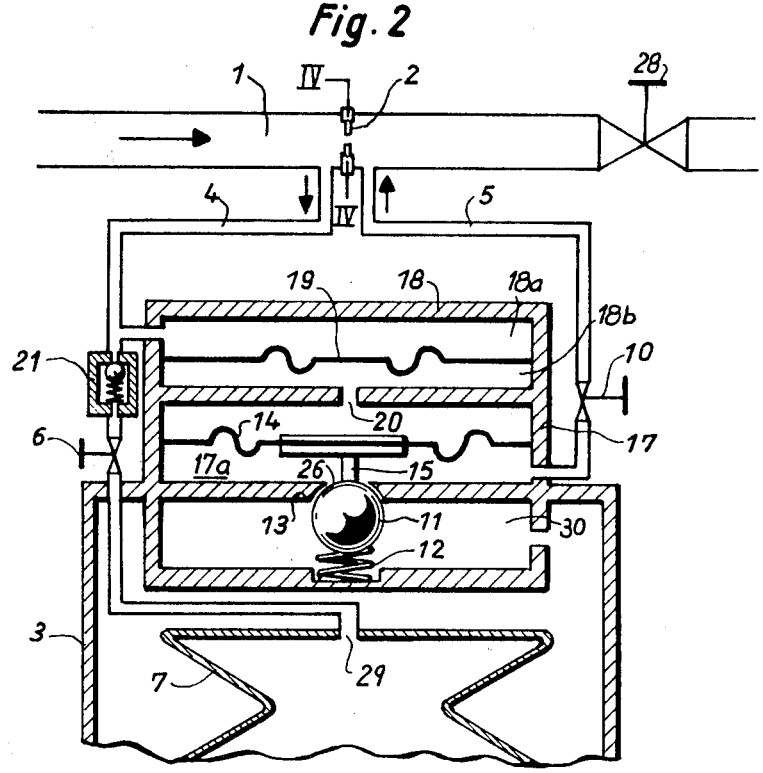
Fig. 2
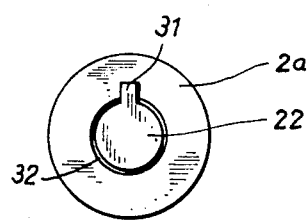
Fig. 3
Fig. 4

FLUID-PROPORTIONING DEVICE FOR ADDING A PREDETERMINED PROPORTION OF A SOLUBLE SUBSTANCE TO A FLUID IN A CONDUIT

BACKGROUND OF THE INVENTION

In proportioning devices of the prior art the introduction of a dissolved substance into the fluid stream is controlled by the pressure difference produced in adjacent sections of a conduit by a flow-restricting device such as a slit, a jet or a venturi. As a result of the restriction, the fluid in the conduit is backed up and forced into a bypass branching off the conduit upstream of the restricting passageway. The bypass includes an intake line leading from the conduit into a tank containing the soluble substance to be mixed with the fluid, and an outlet line leading from the tank back into the conduit at a station downstream of the restricting passageway. In the interior of the tank the intake line terminates in the interior of a bellows concentrically and coaxially positioned in the tank. The bottom part of the bellows, which is formed as a stop plate with at least one opening therethrough, is supported on the surface of the soluble substance in the tank.

At a predetermined fluid pressure differential existing in the conduit on opposite sides of the restriction, the total quantity of fluid diverted into the bypass is a function of the total resistance to flow therein.

In time intervals during which the fluid is at rest in the conduit, that is, when no fluid is withdrawn therefrom, there is a chance that pressure fluctuations in the conduit will set up fluid oscillations throughout the system which flush substantial quantities of the dissolved substance into the fluid, particularly if the tank contains air in addition to the soluble substance. As a result of such fluctuations, which are largely unavoidable, a disproportionate concentration of the additive is introduced into the fluid. In order to avoid this contingency most prior art devices include, both in the intake line and in the outlet line of the bypass, an automatically operable flow control valve.

It has been further suggested that proportioning devices of the described type include a check valve in the inlet line and a positively actuated valve in the outlet line of the bypass, so that a pressure reservoir is built up in the volume of air present in the tank. In this way overconcentration of the additive in the fluid is prevented whenever pressure fluctuations in the main conduit are transmitted to the fluid in the bypass. The installation of such valves does not, however, eliminate the danger of a temporary overconcentration of the additive, since pressure equalization takes place only at the inception of fluid withdrawal from the conduit.

SUMMARY OF THE INVENTION

It is, therefore, an object of the present invention to overcome the disadvantages of known bypass proportioning devices by providing a system wherein the danger of overconcentration of an additive is eliminated.

Another object is to prevent fluid oscillations in the bypass.

A further object is to improve the reliability of the automatically operable valve system of the prior art.

Still another object is to prevent overconcentration of the additive in the fluid by means which are simple and inexpensive to install.

These objects and others which will become apparent hereinafter are attained, in accordance with the present invention, by adding to the outlet line a check valve operatively connected with a diaphragm. Whenever the fluid pressure in the intake line exceeds the fluid pressure in the outlet line the diaphragm causes the valve to open so that fluid can return into the conduit, whereby pressure equalization is restored. According to one preferred embodiment a shock absorber for pressure fluctuations in the conduit, lined up in series with a diaphragm, comprises a second diaphragm and a viscous fluid in the space defined by the two diaphragms in their respective housings.

The flow restriction in the conduit comprises resilient means actuatable by low-velocity fluid to partially close the passageway and to open it at high-velocity fluid flow. Thus a pressure differential is maintained at opposite sides of the restriction, regardless of the pressure in the conduit, which contributes to the correct proportioning of the soluble substance in the circulating fluid.

In a preferred embodiment the intake line and the outlet line each include a throttle valve to meter the quantity of fluid circulating therethrough, and to oppose the effect of sudden pressure changes in the conduit upon the fluid in the bypass. If pressure in the conduit increases while the fluid therein is at rest, a quantity of the fluid corresponding to a decrease in the volume of air in the interior of the tank is diverted into the bypass and returned into the conduit when the pressure has decreased. Provided that the volume of fluid in the interior of the bellows is substantially greater than the volume of air in the tank, fluid mixed with the additive is effectively kept from entering the conduit.

The above and other objects, features and advantages of the present invention will become more readily apparent from the following drawing.

BRIEF DESCRIPTION OF THE DRAWING

FIG. 2 is a schematic longitudinal cross-sectional view of another embodiment of the device according to the present invention;

FIG. 3 is a front elevational view of the restriction 2 of FIG. 2; and

FIG. 4 is a sectional view of a detail taken along lines IV—IV of FIG. 2.

DESCRIPTION OF THE PREFERRED EMBODIMENTS

Figure 1:
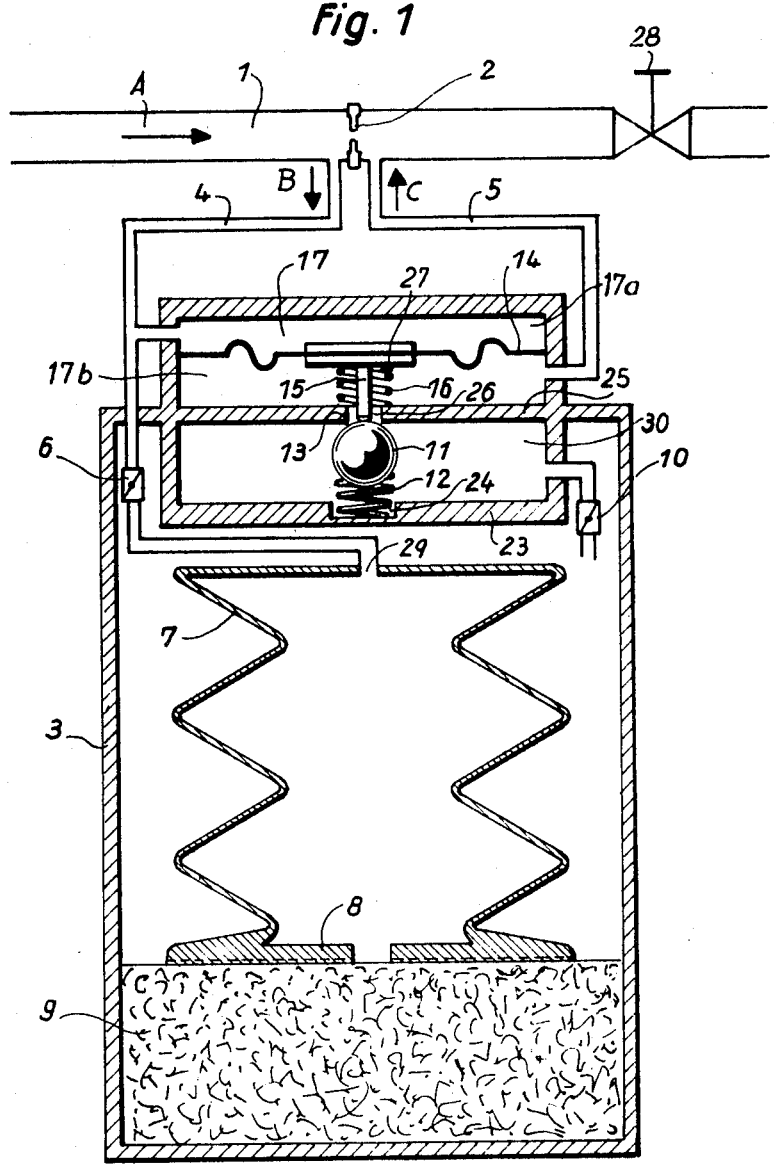
FIG. 1 is a schematic longitudinal cross-sectional view of the device according to the present invention.

The drawing shows a conduit 1 through which fluid from a source is directed to flow in the direction of the arrow A under the influence of means not shown. A restriction 2 is built into the conduit 1, comprising a fluid passage of substantially smaller cross section than the cross section of the conduit on opposite sides of the restriction. Downstream of the restriction 2 a throttle valve 28 is disposed in the conduit 1 whereby fluid flow therethrough can be controlled. Upstream of the restriction 2 a bypass branches off conduit 1, comprising an intake line 4 through which fluid flow occurs in the direction of the arrow B, and an outlet line 5 is located downstream of the restriction 2 and through which fluid flows in the direction of the arrow C and into conduit 1.

Intake line 4 which leads into the interior of a tank 3 includes a throttle valve 6 of conventional design to regulate the fluid flow. In the interior of the tank 3 the intake line 4 terminates at an orifice 29 provided in one end wall of a bellows 7 disposed in the tank 3, concentrically and coaxially aligned therewith. The opposite end wall 8 of the bellows 7 is formed as a disc having at least one opening therethrough, and resting on the surface of the substance 9 stored in the tank 3. The substance 9 is preferably in the form of suitably sized particles such as granules, permitting a vigorous contacting of the substance by the fluid.

The outlet or return line 5 originating in the tank 3 exteriorly of the bellows 7, comprises a throttle valve 10 corresponding to the throttle valve 6 in the intake line 4, and subsequent thereto, a ball check valve 11 disposed in a valve chamber 30. Valve 11 is urged against the valve seat 13 by compression spring means 12. One end of spring means 12 is attached to wall 23 of the chamber 30 in a recess 24 provided therein, and the other end of spring 12 bears against the valve 11.

A diaphragm chamber 17 having approximately the same dimensions as valve chamber 30 is superposed thereon. Wall 25 which is parallel to wall 23 of valve chamber 30 is common to both the valve chamber and the diaphragm chamber 17, and chambers 30 and 17 are interconnected by means of an opening 26, which is located opposite recess 24 in wall 23. A pin 15, attached at one end to a diaphragm holder 27 is movable through opening 26 to press against valve 11. Helical spring means 16 concentric with pin 15 are attached at one of their ends to holder 27 and abut, at their opposite end against the annular surface surrounding opening 26 in the chamber 17. Chamber 17 houses a diaphragm 14 disposed substantially parallel with the walls 23 and 25, and vulcanized to the sidewalls of the chamber 17. Diaphragm 14 which is made of a resilient material such as rubber, a synthetic, or a corrugated metal sheet, effectively and hermetically seals off an upper compartment 17a of chamber 17 from a lower compartment 17b. Compartment 17a communicates with the intake line 4 through a duct leading from the interior of the compartment into the line 4 at a station upstream of the throttle valve 6, and compartment 17b communicates with the outlet line 5 through a duct leading outwardly from the interior of the compartment at a station downstream of the throttle valve 10, and of the ball check valve 11.

As long as there is no withdrawal of fluid from conduit 1 the outlet line 5 is closed by valve 11. Since pressure fluctuations in conduit 1 cause only minor oscillations in the intake line 4, a return of fluid mixed with an overconcentrated dose of the dissolved substance into conduit 1, upstream of restriction 2, is effectively prevented.

If fluid is withdrawn from conduit 1, that is, if there is movement of fluid through the conduit, so that a pressure differential develops at opposite sides of the restriction 2, the pressure is transmitted through the intake line 4 into chamber 17a and brought to bear against diaphragm 14. Opposed only by the relatively weak forces of spring means 12 and 16, the pin 15 attached to the diaphragm holder 27 is pushed against the ball valve 11 to move it away from valve seat 13 and permit fluid flow from chamber 30 into the compartment 17b of chamber 17, from where the fluid is returned into the conduit 1 downstream of the restriction 2. When fluid withdrawal out of conduit 1 ceases, that is, when the pressure differential disappears, the resilient diaphragm 14 is restored to its original position, whereby valve 11 is again reset into the closing position.

According to the embodiment shown in FIG. 2, a second diaphragm 19 in a second diaphragm chamber 18 is superposed on diaphragm chamber 17 and has one of its walls in common therewith. Diaphragm chamber 18 which is of substantially identical dimensions as chamber 17 contains diaphragm 19 affixed, in parallel alignment with diaphragm 14, to opposite walls of the chamber. Diaphragm 19 hermetically seals off one compartment 18a from compartment 18b of the chamber 18. The intake line 4 communicates with compartment 18a through a duct branching off the intake line 4 and terminating at an aperture in a wall of the compartment 18a. Compartment 18b and compartment 17a communicate with each other via an opening 20 of small diameter provided in the wall which is common to both chambers and located opposite the opening 26. Compartments 18b and 17a enclose a quantity of viscous fluid such as an oil, a glycerine or a glycol. The time required for actuation of the pin 15, respectively for movement of the valve 11 away from, and toward the valve seat 13, depends on the viscosity of the viscous damping fluid in compartments 18b and 17a, on the diameter of opening 20, and on the pressure differential in the device. By choosing suitably dimensioned parameters the valve may be kept in the closed position during brief but wide pressure fluctuations up to several atmospheres, whereas during longer lasting but small pressure fluctuations, for example, of the order of hundredths of an atmosphere, the diaphragm is sufficiently depressed to cause the valve to open.

Systems exposed to pressure fluctuations of great amplitude are advantageously provided with an additional relief valve 21 in the intake line upstream of the throttle valve 6.

The restricting passageway 2 comprises an annular element 2a and a disc-shaped plug 22 as shown in FIGS. 3 and 4. The plug 22 which is made of resilient material almost completely closes the circular passage provided in element 2a and is attached thereby by a resilient tab 31. At low-velocity fluid flow, the plug 22 and the element 2a from a substantially plane surface, permit fluid to pass through a small annular interspace 32 between the outer circumference of the plug and the inner circumference of the annular element, so that an effective pressure difference is maintained which guarantees a reliable functioning of the ball check valve 11. At high-velocity fluid flow the plug 22 is forced outwardly in the direction of the fluid flow, so that a wider passage is opened up to transmit an amount of fluid which is adequate to prevent an excessive decrease in pressure in the conduit while the valve 11 is open.

What we claim is:

1. In a fluid-proportioning device for proportionally feeding a liquid-dissolved substance into liquid that flows through a conduit, and for counteracting excessive feed of such substance after a period of zero flow rate, by a liquid bypass system around a flow-restricting passageway in the conduit, the improvement which comprises, in combination: a tank in said liquid bypass system for storing the soluble substance; a bellows coaxially positioned in said tank and largely filling it, said bellows having one end connected to said inlet and an opposite end including at least one opening, said opposite end being formed as a stop plate resting on said substance in said tank; intake means connecting said bellows and said conduit upstream of said passageway; outlet means connecting said tank and said conduit downstream of said passageway; a ball check valve and a valve seat for the same, interposed on said outlet means between said tank and said passageway; a pressure-sensitive diaphragm having a spring-biased projection thereon to urge said ball check valve out of said seat; a first walled chamber, housing said diaphragm; a second walled chamber superposed on said first chamber and having a common wall therewith, said common wall having an opening therethrough, and a diaphragm in said second chamber located substantially parallel to said diaphragm in said first chamber and attached to opposite walls of said second chamber, said second chamber being connected to said intake and outlet means for shifting, through the diaphragm in said first chamber, such ball check valve to effect said proportional feeding; and spring means resiliently supporting said ball check valve to bias the pressure-sensitive diaphragm in the first chamber to fully close the ball check valve when such flow rate falls to zero.

2. The device defined in claim 1 wherein said first chamber and said second chamber each comprise two compartments separated by said diaphragms.

3. The device defined in claim 2 comprising a viscous fluid in said compartments of said chambers contiguous to each other.

4. The device defined in claim 3 wherein said viscous fluid is an oil.

5. The device defined in claim 3 wherein said viscous fluid is a glycerine.

6. The device defined in claim 3 wherein said viscous fluid is a glycol.

7. The device defined in claim 1, wherein said flow-restricting passageway comprises an annular element having an outer circumference adjacent with the inner circumference of said conduit, and an inner circumference substantially smaller than said outer circumference, a resilient disc concentric with said annular element having an outer circumference smaller than said inner circumference of said annular element thereby providing a small interspace therebetween, and a tab extending outwardly from said disc connecting said disc and said annular element.